(12) United States Patent
Sinha et al.

(10) Patent No.: US 12,470,674 B2
(45) Date of Patent: Nov. 11, 2025

(54) INTRAOCULAR SYSTEM FOR TRANSMITTING DATA AND POWER OPTICALLY TO AN IMPLANT

(71) Applicant: Twenty Twenty Therapeutics LLC, South San Francisco, CA (US)

(72) Inventors: Supriyo Sinha, Menlo Park, CA (US); Dimitri Azar, Chicago, IL (US)

(73) Assignee: Verily Life Sciences LLC, Dallas, TX (US)

( * ) Notice: Subject to any disclaimer, the term of this patent is extended or adjusted under 35 U.S.C. 154(b) by 207 days.

(21) Appl. No.: 18/192,188

(22) Filed: Mar. 29, 2023

(65) Prior Publication Data

US 2024/0333881 A1    Oct. 3, 2024

(51) Int. Cl.
| | |
|---|---|
| *H04N 7/18* | (2006.01) |
| *A61B 3/14* | (2006.01) |
| *A61F 2/14* | (2006.01) |
| *A61F 2/48* | (2006.01) |
| *H04B 10/116* | (2013.01) |
| *H04B 10/40* | (2013.01) |

(52) U.S. Cl.
CPC .............. *H04N 7/183* (2013.01); *A61B 3/14* (2013.01); *A61F 2/141* (2013.01); *A61F 2/482* (2021.08); *H04B 10/116* (2013.01); *H04B 10/40* (2013.01); *A61F 2250/0002* (2013.01)

(58) Field of Classification Search
CPC . H04N 7/183; A61B 3/14; A61F 2/141; A61F 2/482; A61F 2250/0002; A61F 2/14; H04B 10/116; H04B 10/40; G02B 27/017
See application file for complete search history.

(56) References Cited

U.S. PATENT DOCUMENTS

| | | | |
|---|---|---|---|
| 5,653,751 | A | 8/1997 | Samiy et al. |
| 7,776,087 | B2 | 8/2010 | Aharoni et al. |
| 8,437,858 | B2 | 5/2013 | Dapper et al. |
| 10,271,945 | B2 | 4/2019 | Wortz et al. |
| 10,299,912 | B2 | 5/2019 | Grant |

(Continued)

FOREIGN PATENT DOCUMENTS

| | | |
|---|---|---|
| WO | 2020/231517 A1 | 11/2020 |
| WO | 2020/231518 A1 | 11/2020 |

(Continued)

OTHER PUBLICATIONS

Sarah Y. Shim et al., "Feasibility of Intraocular Projection for Treatment of Intractable Corneal Opacity", Cornea, Apr. 2019: 38(4): 523-527.

(Continued)

*Primary Examiner* — Joseph W Becker
(74) *Attorney, Agent, or Firm* — Haynes and Boone, LLP

(57) ABSTRACT

An intraocular system that includes a headset that optically transmits data and power to an implant. The headset includes a camera to capture image data that includes a visual representation of an environment of the headset and an optical transmitter to transmit the image data as an optical signal into a cornea of an eye of a user when the user is wearing the headset. The implant includes an optical receiver to receive the optical signal through the cornea and an image formation device orientated to present the image data from the optical signal onto a retina of the eye when the implant is inside the eye.

20 Claims, 8 Drawing Sheets

(56) References Cited

U.S. PATENT DOCUMENTS

| | | |
|---|---|---|
| 10,467,992 B2 | 11/2019 | Deering et al. |
| 11,364,110 B2 | 6/2022 | Webb |
| 11,376,163 B2 | 7/2022 | Yu et al. |
| 2005/0154457 A1 | 7/2005 | Aharoni et al. |
| 2013/0285287 A1 | 10/2013 | Ko et al. |
| 2017/0007835 A1 | 1/2017 | Chung et al. |
| 2017/0330042 A1* | 11/2017 | Vaziri ................ G02B 26/0875 |
| 2018/0143454 A1 | 5/2018 | Humphreys et al. |
| 2019/0232051 A1 | 8/2019 | Gross et al. |
| 2020/0038247 A1 | 2/2020 | Liran et al. |
| 2020/0345554 A1 | 11/2020 | Saini |
| 2022/0042672 A1* | 2/2022 | Raring ................ H04B 10/116 |
| 2022/0233357 A1 | 7/2022 | Saini |
| 2022/0252849 A1 | 8/2022 | Lee et al. |
| 2023/0387729 A1* | 11/2023 | Chandra ................ H02J 50/10 |

FOREIGN PATENT DOCUMENTS

| | | |
|---|---|---|
| WO | 2020/231519 A1 | 11/2020 |
| WO | 2023/041747 A1 | 3/2023 |

OTHER PUBLICATIONS

International Search Report and Written Opinion for International Application No. PCT/US2023/019850 mailed Nov. 28, 2023, 14 pages.

\* cited by examiner

INTRAOCULAR SYSTEM FOR TRANSMITTING DATA AND POWER OPTICALLY TO AN IMPLANT

FIELD

An embodiment of the disclosure relates to transmitting data and power optically to an implant that is inside an eye of a person. Such techniques are useful for wirelessly communicating with an implant and for wirelessly powering electronics of the implant. Other embodiments are also described herein.

BACKGROUND

Disease or injury to a cornea of a person can lead to opacification or significant optical damage to the cornea, such that the individual may be vision impaired (e.g., effectively rendered blind). Current solutions rely on eye banks for corneal transplants, and artificial corneas. Both, however, have issues with transplant rejection and surgical complications, and may also result in low visual acuity.

Blindness due to corneal disease or injury may occur despite the person having a fully functioning retina. For such persons, who have a functioning retina but otherwise are essentially blind due to vascularization or damage to the cornea, implantation of an intraocular projector may restore vision to the person. The intraocular projector receives an image of a scene before the person, the image having been captured by a head mounted camera, and then projects the image onto the retina of the eye. Another option is an implantation of an intraocular micro-display into the lens of the eye (e.g., into the capsular bag region), which may receive and display the image onto the user's retina.

SUMMARY

Bypassing a diseased or damaged cornea using an intraocular system may alleviate visual impairment. For example, such an intraocular system may include a headset and an implant that may provide a (visually impaired, due to having opaque corneas, for example) user a visual reproduction of a scene of an environment in which the user is located. In particular, the headset may include a camera that captures video (e.g., as image data) of a scene that is before the person. For example, the camera may have a field of view that is directed away from and in front of the user, while the headset is worn (on the head of the user). The headset may wirelessly transmit the video to the implant, which may then use an image formation device, such as a micro-display, to present the (color) video towards the user's retina. As a result, the user may view a scene in front of the user in a similar (or same) fashion as a person with "normal" vision (e.g., a person without the visual impairment and/or without the use of the intraocular system).

An intraocular implant may require a sufficient amount of image data to properly present images to a user. In particular, to provide a user with a visual experience that is as natural as a user with normal vision, for example by presenting the image data at a frequency that is similar or the same as human vision (e.g., between 30 to 60 image frames per second), the intraocular system requires a fast and efficient wireless connection between the headset and the implant. Although a radio frequency (RF) wireless connection, such as BLUETOOTH, may be an effective method for wireless data transmission, such a connection may have significant latency. As a result, the images perceived by the user may be delayed from when the images were captured by the camera. In addition, the intraocular implant may require electrical power to drive electronics and optics that allow the implant to present the image data towards the user's retina. Therefore, there is a need for an intraocular system that may wirelessly transmit data with very little to no latency and may efficiently wirelessly transmit power to the implant.

The present disclosure provides an intraocular system that includes a headset, such as smart glasses, including a camera to capture image data that includes a visual representation of an environment of the headset (e.g., in a frontal or anterior direction a user who is wearing the headset) and an optical transmitter to transmit the image data as an optical signal into a cornea of an eye of the user when the user is wearing the headset, and an (intraocular) implant including an optical receiver to receive the optical signal through the cornea and an image formation device (e.g., a micro-display) orientated to present the image data from the optical signal onto a retina of the eye when the implant is inside the eye.

In one embodiment, the optical signal includes modulated light that passes through the cornea of the eye and is directed towards the optical receiver while the headset is worn by the user and while the implant is inside the eye. In another embodiment, the optical transmitter is a first optical transmitter, and the optical signal is a first optical signal, and the headset further includes a second optical transmitter to transmit, through the cornea of the eye, a request to establish an over-the-air optical connection between the first optical transmitter and the optical receiver, where the first optical transmitter is to transmit the image data once the over-the-air connection is established. In some embodiments, the first optical transmitter includes a low-powered laser diode or any type of light source, such as a light emitting diode (LED), and the second optical transmitter includes a light source, such as a LED. In another embodiment, the second optical transmitter includes a first optical transceiver, where the implant further includes a second optical transceiver to transmit an acknowledgement as a third optical signal through the cornea of the eye and directed towards the first optical transceiver responsive to receiving the second optical signal, and the over-the-air optical connection is established responsive to the first optical transceiver receiving the third optical signal.

In one embodiment, the optical transmitter is a first optical transmitter, and the optical signal is a first optical signal, where the headset further includes a second optical transmitter to transmit a second optical signal through the cornea of the eye while the headset is worn by the user, and the implant further includes a photovoltaic device to produce power for the implant, responsive to receiving the second optical signal when the implant is inside the eye. In another embodiment, the first optical transmitter includes a low-powered laser diode, and the second optical transmitter comprises a high-powered laser diode. In some embodiments, the high-powered laser diode includes an infrared laser diode that is arranged to produce the second optical signal with a wavelength between 800 nm and 1,060 nm. In another embodiment, the camera is a first camera, and the headset further includes: an inward facing camera to capture images of the eye of the user while the headset is worn by the user; and a controller that is communicatively coupled with the inward face camera and the second optical transmitter, where the controller is configured to determine whether the eye of the user is open based on the images captured by the inward facing camera, cause the second optical transmitter to transmit the second optical signal while the eye of the user is open, and prevent the second optical transmitter from transmitting the second optical signal while the eye of the user is closed.

Another embodiment of the disclosure includes a method performed by an intraocular implant, the method includes: receiving, by an optical receiver of the intraocular implant and while the intraocular implant is inside an eye of a user, an optical signal through a cornea of the eye and from a headset that is being worn by the user, where the optical signal comprises image data captured by a camera of the headset; and presenting, by an image formation device of the intraocular implant, the image data onto a retina of the eye.

In one embodiment, the optical receiver is a first optical receiver, the method further includes establishing an over-the-air optical connection between the first optical receiver and an optical transmitter of the headset using a second optical receiver of the intraocular implant, where the optical signal is received once the over-the-air connection is established. In another embodiment, the optical signal is a first optical signal and the optical transmitter is a first optical transmitter, where establishing the over-the-air optical connection includes: receiving, by the second optical receiver, a second optical signal through the cornea of the eye and from the headset, where the second optical signal comprises a request to establish the over-the-air optical connection between the first optical receiver and a first optical transmitter of the headset; and transmitting, by a second optical transmitter of the intraocular implant, a third optical signal through the cornea of the eye that comprises an approval.

In one embodiment, the optical signal is a first optical signal, where the method further comprises converting, by a photovoltaic (PV) device of the intraocular implant, a second optical signal that is being transmitted by the headset into power for the intraocular implant. In another embodiment, the PV device is a first PV device, where the method further includes: determining a first power output level of the first PV device; converting, by a second PV device of the intraocular implant, a third optical signal that is being transmitted by the headset into power for the intraocular implant; determining a second power output level of a second PV device; and responsive to determining that the first power output level is less than the second power output level, transmitting, by an optical transmitter of the intraocular implant, a fourth optical signal through the cornea of the eye and to the headset, the fourth optical signal comprising a request to cease transmitting the second optical signal. In another embodiment, the first optical signal has a different wavelength than the wavelength of the second optical signal. In some embodiments, the wavelength of the second optical signal is between 800 nm and 1,060 nm.

Another embodiment of the disclosure includes a method performed by an intraocular system that includes a headset and an implant, the method includes receiving image data captured by a camera of the headset while the headset is being worn by a user, image data including a visual representation of an environment of the headset. The method transmits, by a high-powered laser diode, a first over-the-air optical signal through a cornea of an eye of the user to optically power the implant, and transmits, by a low-powered laser diode, a second over-the-air optical signal through the cornea, where the second over-the-air optical signal comprises the image data captured by the camera, and the first and second over-the-air optical signals are directed towards the implant while the implant is inside the eye of the user.

In one embodiment, the high-powered laser diode comprises an infrared laser diode that is arranged to produce the first over-the-air optical signal with a wavelength between 800 nm and 1,060 nm. In another embodiment, the method further includes receiving image data captured by an inward facing camera of the headset while the headset is worn by the user, the image data captured by the inward-facing camera includes at least a portion of the eye; determining whether the eye is open or closed based on the image data captured by the inward-facing camera; and responsive to determining that the eye is closed, causing the high-powered laser diode to stop transmitting the first over-the-air optical signal. In some embodiments, the method further includes transmitting, by a light emitting diode (LED), a third over-the-air optical signal into the cornea of the eye and to the implant that is inside the eye, where the third over-the-air optical signal comprises a request to begin transmission of the image data, where the second over-the-air optical signal is transmitted responsive to receiving, by a photodiode of the headset, a fourth over-the-air optical signal from the implant and through the cornea of the eye.

The above summary does not include an exhaustive list of all embodiments of the disclosure. It is contemplated that the disclosure includes all systems and methods that can be practiced from all suitable combinations of the various embodiments summarized above, as well as those disclosed in the Detailed Description below and particularly pointed out in the claims. Such combinations may have particular advantages not specifically recited in the above summary.

BRIEF DESCRIPTION OF THE DRAWINGS

The embodiments are illustrated by way of example and not by way of limitation in the figures of the accompanying drawings in which like references indicate similar elements. It should be noted that references to "an" or "one" embodiment of this disclosure are not necessarily to the same embodiment, and they mean at least one. Also, in the interest of conciseness and reducing the total number of figures, a given figure may be used to illustrate the features of more than one embodiment, and not all elements in the figure may be required for a given embodiment.

DETAILED DESCRIPTION

Several embodiments of the disclosure with reference to the appended drawings are now explained. Whenever the shapes, relative positions and other embodiments of the parts described in a given embodiment are not explicitly defined, the scope of the disclosure here is not limited only to the parts shown, which are meant merely for the purpose of illustration. Also, while numerous details are set forth, it is understood that some embodiments may be practiced without these details. In other instances, well-known circuits, structures, and techniques have not been shown in detail so as not to obscure the understanding of this description. Furthermore, unless the meaning is clearly to the contrary, all ranges set forth herein are deemed to be inclusive of each range's endpoints.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Embodiments of the intraocular system disclosed herein may be suitable for patients with intact retinas, yet are blind due to vascularization, occlusion, opacity, or otherwise damage of the cornea. The disclosed system seeks to (at least partially) restore sight to these patients by implanting an electronic intraocular implant (which may be referred to herein as "implant") into the eye, such as in the capsular sack region of the eye previously occupied by an excised lens. As described herein, the implant may include an image formation device, such as a micro-display that is arranged to project regenerated images onto the patient's (e.g., fully functioning) retina.

Figure 1:
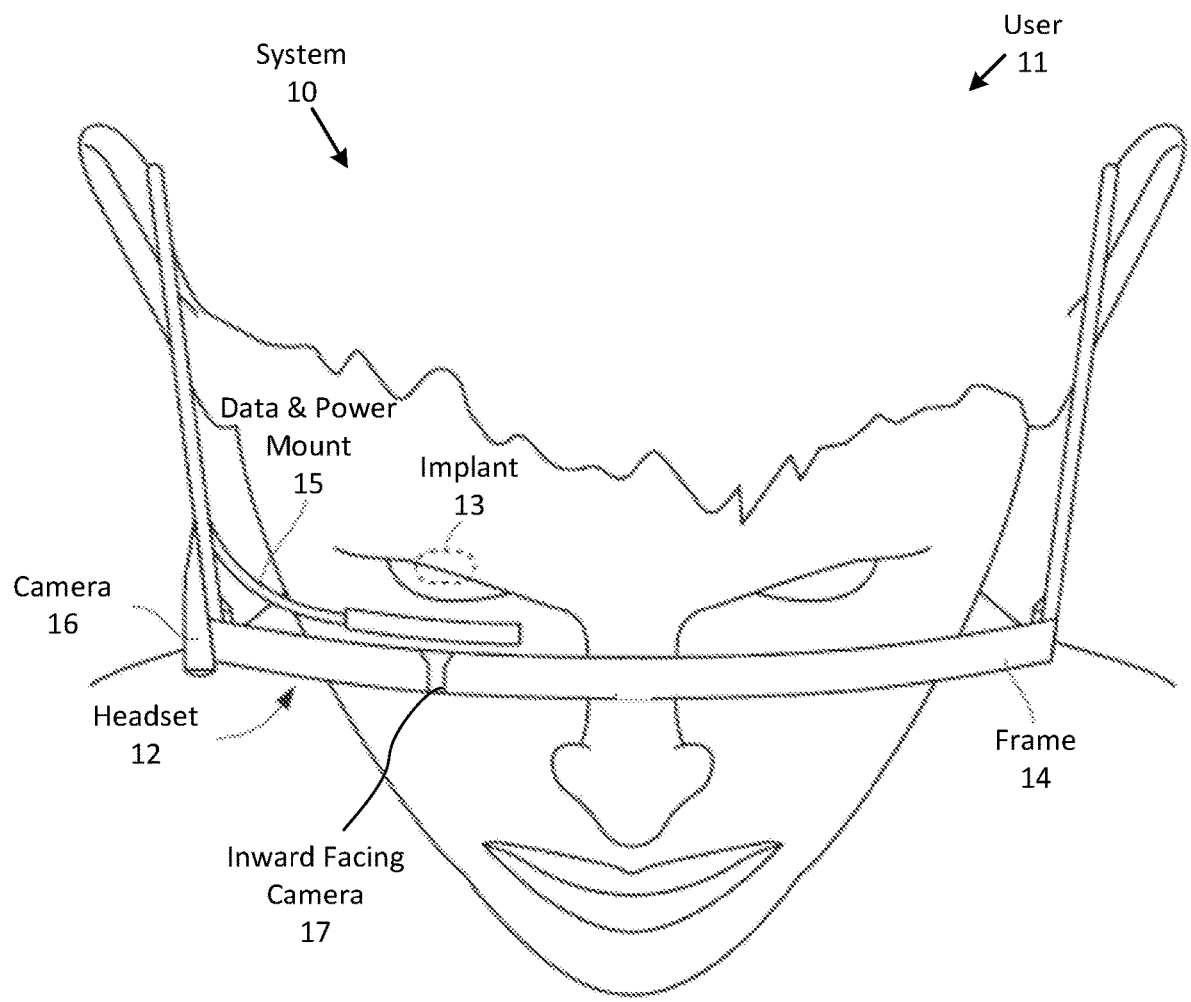
FIG. 1 is a plan view illustration of a user and an example intraocular system that includes a headset and an implant.
Figure 2:
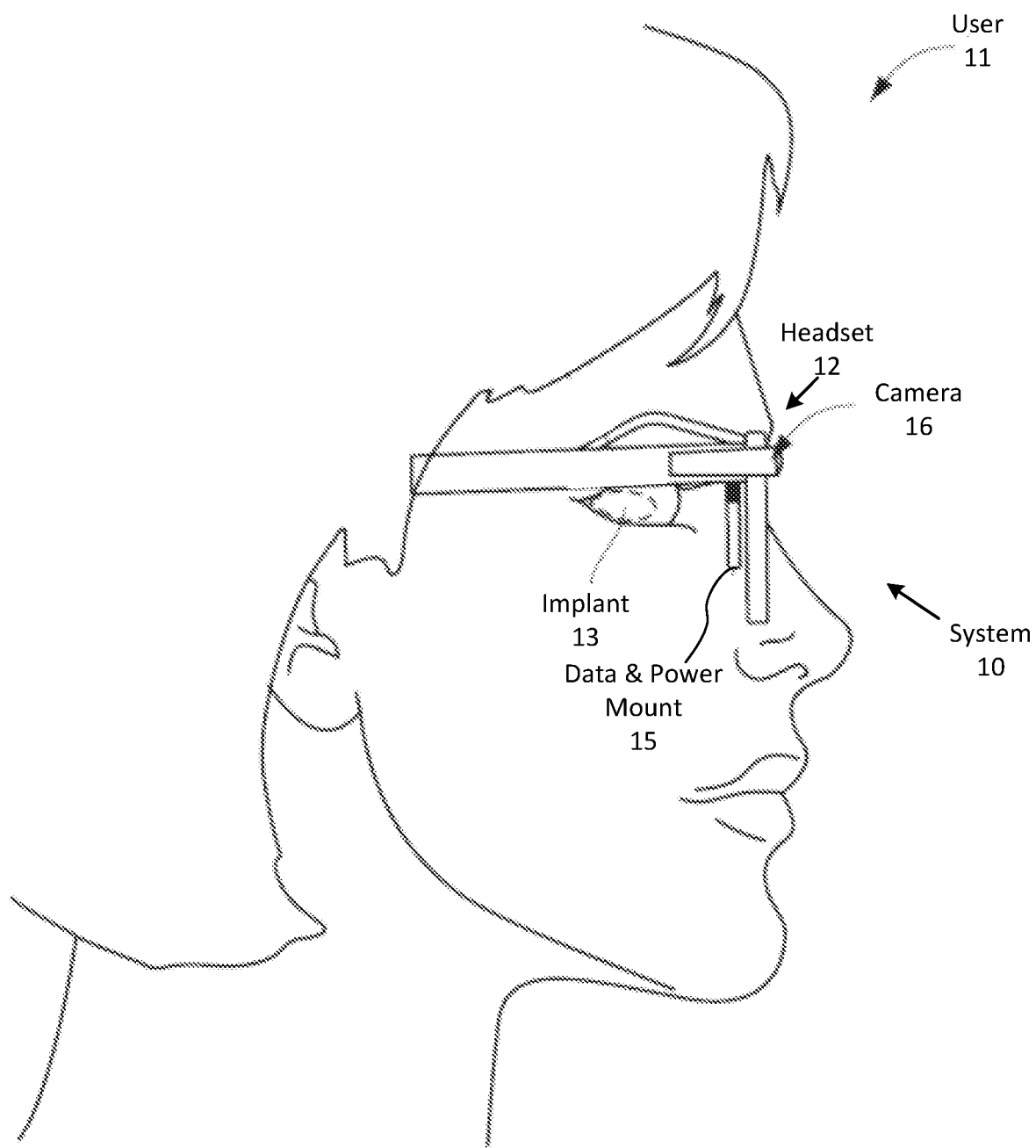
FIG. 2 is a side-view illustration of the user and the example intraocular system.
Figure 3:
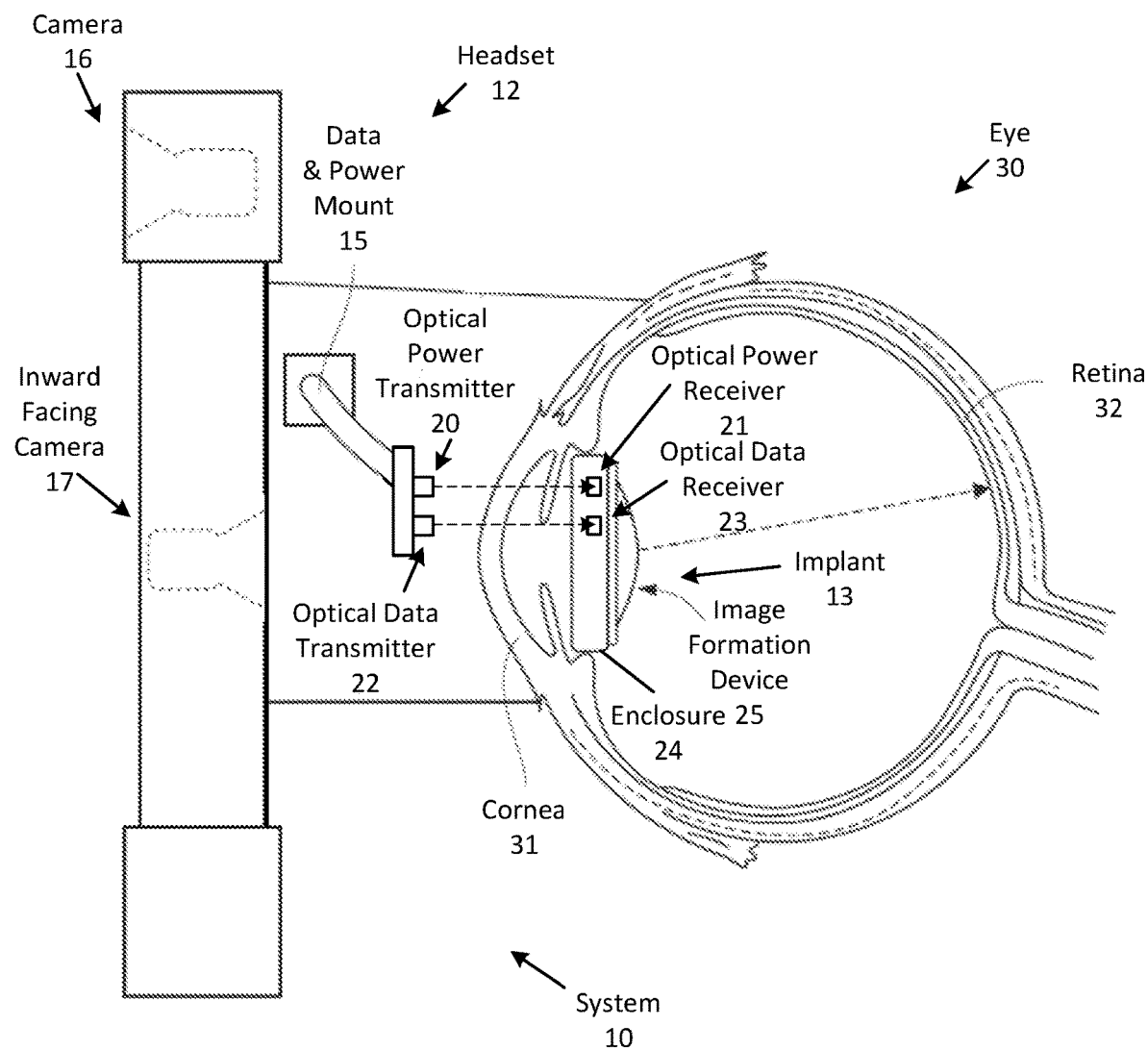
FIG. 3 is a cross-sectional illustration of the user and the example intraocular system in which the headset is optically transmitting data and powering the implant.

FIGS. 1-3 show a user 11 and an example intraocular system (hereafter may be referred to as "system") 10 that includes a headset 12 and an (intraocular) implant 13, in accordance with an embodiment of the disclosure. FIGS. 1 and 2 are plan and side view illustrations, respectively, while FIG. 3 is a cross-sectional illustration of the system 10. As described herein, the intraocular system 10 may be configured to capture, using one or more cameras of the headset, image data (or video data, which may be a reproduction of one or more optical images) that includes a visual representation of the environment (e.g., which may be in an anterior (frontal or forward) direction of the user), and may be configured to optically present (or display) the captured image data through the implant 13 onto the retina of the user. More about presenting video data onto the retina of the user is described herein.

As shown, the illustrated headset 12 is a pair of (e.g., smart) eyeglasses that are being worn by (e.g., on the head of) the user 11, and the implant 13 is (implanted or at least partially) inside the (e.g., capsular sack region of the) user's right eye. In one embodiment, the user 11 may include one or more implants, such as having one implant in the user's right eye (as shown), and another implant in the user's left eye. In which case, the system 10 may perform similar operations to transmit (image) data and power to the other implant, as described herein with respect to implant 13.

As described herein, the headset 12 (or head-mounted device (HMD)) is eyeglasses that includes a frame 14 that is being worn by the user 11. In one embodiment, the headset may be any type of device that may be worn on a user's head, such as an eyepatch, goggles, a visor, headgear, headphones, or otherwise. In another embodiment, the headset may be any type of electronic device, which may or may not be a part of (or worn on) the user's head. For example, the headset may be a part of a user's appeal (e.g., a part of or integrated into a hat worn by the user 11). Although the headset 12 is illustrated as a single contiguous frame 14, in other embodiments, headset may be segmented into two or more body-wearable modular components that may be interconnected and mounted or worn in various locations about the body or clothing.

The headset 12 includes a camera 16, an inward-facing camera 17, a data and power mount 15 to which one or more optical transmitters (and/or optical receivers) may be coupled. In particular, each or least some of the elements of the headset may be coupled to the frame 14 of the headset. In this example, the frame is a glasses frame, where the elements are a part of (or integrated into) the frame 14. In one embodiment, the headset may include more or less elements, such as having more or less cameras.

In one embodiment, the cameras 16 and 17 may each be designed to capture optical (e.g., color) images as image data, where the data produced by each camera includes a scene of a visual representation of a field of view (FOV) of the camera. In another embodiment, the cameras may be designed to capture a video stream, where the stream may include a series of still images (e.g., as video frames) that may be captured by the camera. In one embodiment, the camera 16 may have a frontal FOV that is directed away from the user 11, in a forward direction with respect to the user. As a result, the camera 16 may be arranged to capture image data that includes a visual representation of an environment of the headset 12 (e.g., a room in which the user 11 is located). In one embodiment, the camera 16 may be designed to capture color images, which may be presented onto the user's retina, as described herein. In another embodiment, the inward-facing camera 17 may have an inward FOV that is directed towards at least a portion of the user 11. In particular, the camera 17 may have a FOV that includes (at least a portion of) the user's right eye. As described herein, image data captured by the camera 17 may be used to determine whether the user's eye is open or closed. In another embodiment, either of the cameras may be any type of image capturing device that may capture other types of images. In another embodiment, the camera 17 may be utilized to detect eye gestures/gaze of the user.

The data and power mount 15 is shown as being coupled to (e.g., a temple of) the frame 14, and is arranged to include one or more optical electronic devices, such as optical transmitters (e.g., electronic devices designed to transmit optical signals), optical receivers (e.g., electronic devices designed to receive or detect optical signals), and/or optical transceivers (e.g., electronic devices that includes one or more optical transmitters and/or one or more optical receivers). More about optical electronic devices is described herein. In particular, the optical electronic devices may be attached to the mount via an articulable arm, which may be user (or automatically) manipulated in order to reposition the optical devices. For instance, the mount may be (e.g., manually) movable such that the optical electronic devices may be repositioned so that one or more of the devices include a line of sight towards the cornea of the user's right eye 30. For instance, the optical devices may be positioned such that they are within a threshold distance of the implant 13, while the implant is inside the eye 30. In one embodiment, the mount may be coupled to a different location on the frame 14. As described herein, the optical electronic devices may be configured to provide wireless communication and/or power between the headset 12 and the implant 13. In another embodiment, the headset 12 may have a wired connection (e.g., via one or more wires) to the implant (e.g., where the wires are surgically implanted through a portion (e.g., the eye) of the user).

In one embodiment, the headset 12 may include one or more other electronic devices (or elements). For example, the headset may include an input device (not shown), which may be any type of device that includes one or more user interfaces that allows the headset 12 to receive user input. For example, an input device may be (or include) one or more physical buttons. In another embodiment, the input device may be configured to receive user input via virtual buttons, such as user interface (UI) items that are displayed on a graphical user interface (GUI) of a touch-sensitive display screen, which may be a part of the headset. In one embodiment, the headset may include an input device, which when receives user input may activate (or power on) the headset 12.

Turning to FIG. 3, this figure shows a cross section of the headset 12 and the (e.g., right) eye 30 of the user 11, showing the implant 13 inside the eye 30. As shown, the eye 30 includes a cornea 31 to which (or adjacent to which) the implant 13 is disposed within the eye 30, and the eye 30 includes a retina 32. As described herein, the user's vision may be impaired due to vascularization or damage to the cornea 31, whereas the retina 32 may be capable (or at least partially capable) of converting (e.g., visible) light into electrical signals used by the user's brain to create images. In this case, the implant may be designed to output (or create) a video stream based on image data received from the headset as (e.g., a series of) visible light images, which may then be captured by the retina. For example, the implant includes an image formation device 25 that may be configured to reproduce one or more images (as video), which may be captured by one or more cameras of the system 10, and that are directed towards (as shown by a dashed line with an arrow terminating at) the user's retina 32. In which case, the (e.g., display of the) image formation device may be orientated such that images presented by the device may be captured by at least a portion of the retina 32. In one embodiment, the reception, decoding, and display of the image data may be executed in real-time, and provide the user with virtual, real-time, forward-facing vision, such that the user views images once the camera captures the image data. In particular, the intraocular system may present the image data through the implant within a minimum threshold of time, which may account for a period of time for processing the image data by the headset and/or implant of the intraocular system and/or any latency for transmitting the data between the headset and implant.

In addition, the data and power mount 15 of the headset includes several optical transmitters, and the implant 13 includes several optical receivers. As described herein, the optical transmitters may be configured to produce optical signals (e.g., modulated light) that may be wirelessly transmitted (over-the-air), directed towards at least a portion of the user's eye, such as the cornea, as shown. The optical receivers may be configured to receive the optical signal by sensing the (e.g., light of the) optical signals produced by the optical transmitters that pass through the portion of the cornea of the user's eye. For example, the optical signal received by the receivers may be out-coupled from the cornea 31.

In particular, the mount includes an optical data transmitter 22 and an optical power transmitter 20. The optical data transmitter 22 is arranged to transmit data, such as image data captured by the camera 16, as an optical signal into the cornea 31 of the eye 30 of the user while the user is wearing the headset 12. Specifically, the optical signal transmitted by the data transmitter may be (e.g., visible) light that is modulated according to the image data. The optical power transmitter 20 may be arranged to produce a high-powered optical signal. For example, the optical power transmitter may have an optical output power greater than (or equal to) a power threshold. More about the optical data and power transmitters is described herein.

The implant 13 includes several optical receivers, such as an optical data receiver 23 and an optical power receiver 21. The optical data receiver is arranged to receive (sense) an optical signal that may include data for the implant, such as image data, which may be presented by the image formation device 25 onto the retina 32 of the eye 30 (while the implant 13 is in the eye 30). Specifically, the optical data receiver 23 may be arranged to receive one or more optical signals through the cornea 31 and produced (transmitted) by one or more optical data transmitters of the headset 12. As shown, the optical data receiver is receiving an optical signal being produced by the optical data transmitter 22 that is being transmitted through the cornea. The optical power receiver 23 is arranged to receive one or more optical signals for powering the implant 13. As shown, the optical power receiver 21 is receiving an optical signal that is produced by the optical power transmitter 20. Thus, the implant is able to wirelessly (e.g., over-the-air) receive data and power via one or more optical signals produced by the headset. More about the optical receivers is described herein.

In one embodiment, the mount 15 may be orientated such that the optical power transmitter 20 has a line-of-sight to the optical power receiver 21 and the optical data transmitter 22 has another line-of-sight to the optical data receiver 23, through the cornea 31, such that light produced by the transmitters may be sensed by their respective receivers.

Furthermore, although FIGS. 1-3 illustrate a monocular intraocular system, the illustrated components may be replicated to implement a binocular intraocular system. Furthermore, implant 13 may be operated with different external hardware having different functionality than described herein in connection with headset 12. In fact, implant 13 may be operated without a headset, but rather receive wireless communications from a variety of sources to display a variety of different information.

As illustrated, implant 13 is entirely disposed within eye 30 and does not include electronic cables or tethers extending out of eye 30 to the headset 12. Thus, the implant may be small enough (e.g., and shaped) to fit entirely or partially inside the volume of the lens capsule of the eye, or into the anterior chamber of the eye, or into the vitreous humor of the eye. Similarly, the headset 12 may be an independent, discrete unit that is worn on the user's head. In one embodiment, the headset includes embedded electronics for powering and orchestrating the operation of intraocular system 10 including itself and implant 13, as described herein.

In the illustrated embodiment, the implant 13 includes an enclosure 24 that is arranged to house (at least some of the) elements (electronic components) of the implant 13, as described herein. In one embodiment, the enclosure 24 may be a biocompatible enclosure that is sized and shaped for implantation into eye 30. In one embodiment, enclosure 24 may be sized for implantation into the region of the capsular sack of eye 30, as described herein. In one embodiment, enclosure is a hermetically sealed enclosure fabricated of metal, polymers, or otherwise.

Figure 4:
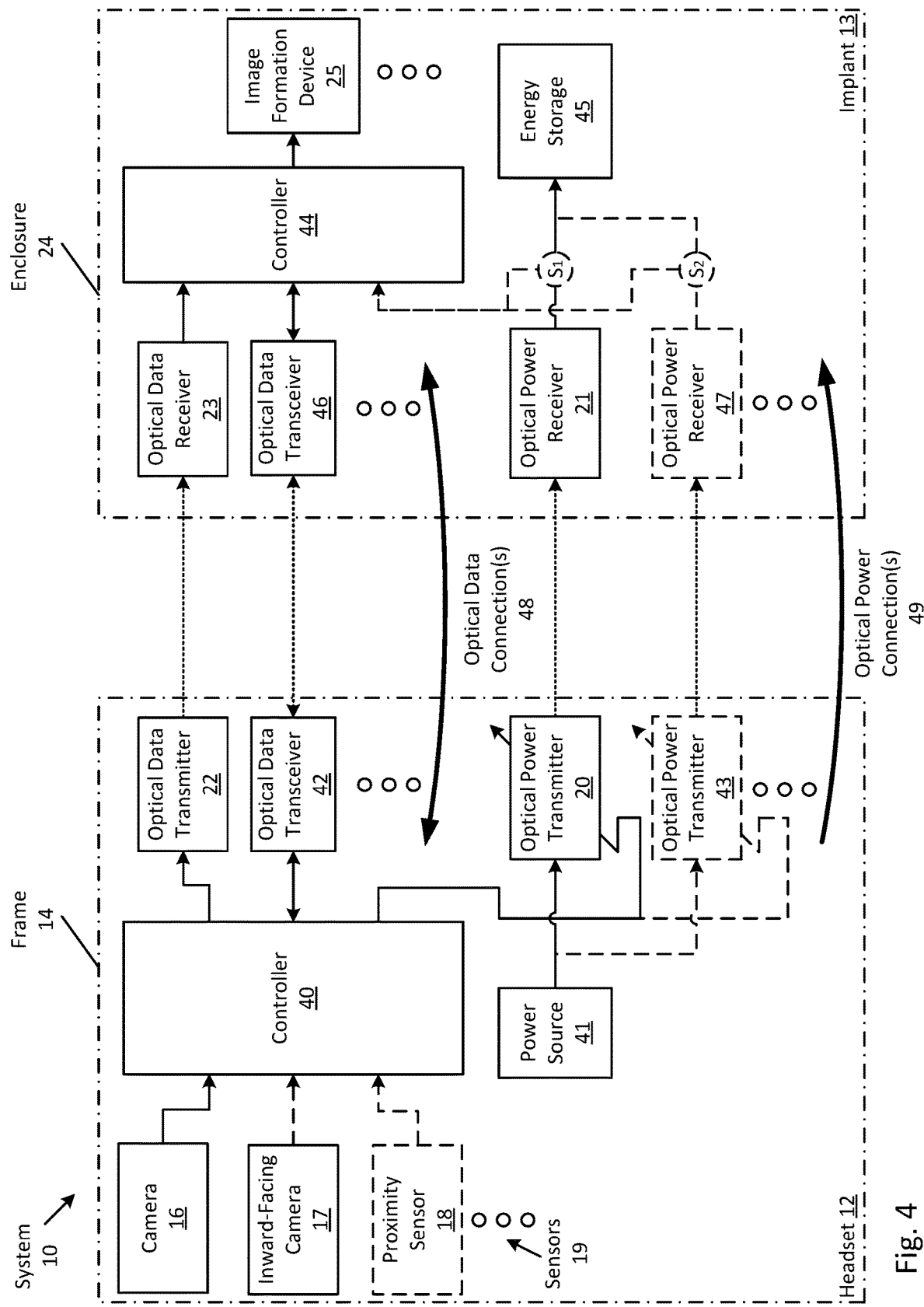
FIG. 4 shows a block diagram of the example intraocular system.

FIG. 4 shows a block diagram of the example intraocular system 10 that includes the headset 12 and the implant 13. As described herein, while in use, the system 10 may be worn by the user, such that the headset 12 may be worn on a user's head and the implant 13 may be inside one of the user's eyes.

As shown, the headset 12 includes several sensors 19, which include the camera 16, the inward-facing camera 17, and a proximity sensor 18. In one embodiment, the headset may include more or less (similar or different) sensors, such as having two or more cameras, each camera having a different FOV, as described herein. The headset 12 also includes a controller 40, a power source 41, the optical data transmitter 22, one or more optical data transceiver(s) 42, the optical power transmitter 20, and an (or one or more) optional optical power transmitter(s) 43. In one embodiment, each of these elements may be a part of or integrated within the frame 14 of the headset 12. In another embodiment, one or more of the elements may be separate from the (e.g., frame 14 of the) headset 12. For example, the headset may receive video data from one or more cameras that are a part of separate electronic devices (where the data may be received via a wireless data connection).

Also shown, the implant 13 includes the optical data receiver 23, one or more optical data transceiver(s) 46, a controller 44, an image formation device 25, the optical power receiver 21, an (one or more) optional optical power receiver(s) 47, an energy storage 45, and one or more optional sensors, S1 and S2. In one embodiment, the headset and/or implant may include more or less elements, such as the headset 12 having two or more optical data transceivers 42 and/or the implant having two or more optical data transceivers 46.

In one embodiment, the one or more sensors 19 may be configured to detect the environment (e.g., in which the headset is located) and produce sensor data based on the environment. In some embodiments, the controller 40 may be configured to perform operations based on the sensor data produced by one or more sensors 19, as described herein.

In one embodiment, the cameras 16 and 17 may be complementary metal-oxide-semiconductor (CMOS) image sensors that may be capable of capturing digital (e.g., still) images including image data that represent FOVs of the cameras, where each field of view includes a scene (e.g., visual representation) of an environment in which the headset 12 is located. In some embodiments, the camera may be a charged-coupled device (CCD) camera type. The cameras may be configured to capture video stream (video data), which may be represented as a series of still digital images (or image frames). As described herein, the camera 16 may be front-facing, while camera 17 may be inward-facing. In one embodiment, the cameras may be positioned anywhere about the headset. In one embodiment, the video streams captured by cameras may be high definition (HD) video that may include 10-bit 4k video, such as, for example, of resolution 3840×2160 pixels (which is also referred to as 2160p), 1920×1080 pixels (also referred to as 1080p video), and 1280×720 pixels (also referred to as 720p video) with a frame rate of 59.94 and/or 60 image frames per second (fps). In another embodiment, the resolution and/or frame rate (as fps) of the video stream captured by either camera may be different.

In some embodiments, the proximity sensor 18 may be any type of electronic device (e.g., an optical sensor) that is designed to detect the proximity (e.g., distance of) one or more objects within the environment, with respect to the headset. In one embodiment, the proximity sensor may produce sensor data, which may be used by the controller 40 to determine whether the headset is being donned on the head of the user. In another embodiment, the headset 12 may include other types of sensors 19. For example, the sensors 19 may include an accelerometer that may be configured to monitor motion (e.g., as a motion sensor) and produce motion data that indicates movement of the (e.g., user who is wearing the) headset 12. In one embodiment, the accelerometer may be (e.g., a part of) an inertial measurement unit (IMU) that is designed to measure (e.g., changes in) the position and/or orientation of the headset 12.

The controller 40 (and/or the controller 44) may be a special-purpose processor such as an application-specific integrated circuit (ASIC), a general-purpose microprocessor, a field-programmable gate array (FPGA), a digital signal controller, or a set of hardware logic structures (e.g., filters, arithmetic logic units, and dedicated state machines). The controller 40 may include memory which may store one or more instructions, which when executed by the controller causes the headset to perform at least some of the operations described herein. In another embodiment, the controller 40 may be communicatively coupled to one or more elements of the headset 12, such as one or more sensors 19 and/or one or more optical (data and/or power) transmitters and/or transceivers. In one embodiment, the controller 40 may be configured to receive sensor data produced by one or more sensors 19, perform video signal processing operations (or video processing operations), and/or networking operations, as described herein. In one embodiment, the controller 40 may be configured to format (encode) image data for transmission to the implant. For instance, the controller may receive image data from the camera 16 and encode the video data into a format that may be suitable for wireless transmission and/or for presenting (e.g., displaying) by the (e.g., image formation device 25 of the) implant. For example, the controller may encode the image data into a desired format, such as MPEG-4. More about the operations performed by the controller are described herein.

The optical data transmitter 22 may be configured to receive a digital signal that includes data, such as image data (e.g., from the controller 40), and may be configured to transmit the data as an (e.g., over-the-air) optical signal, which may be directed towards at least a portion of (e.g., a cornea of) the user's eye. In one embodiment, the optical transmitter may include a light source, such as a laser diode, and drive circuitry, such as an optical modulator, that receives light output from the source and modulates the light to produce the optical signal, as a light carrier signal that is produced according to the digital signal. For example, the optical modulator may control an input drive current to the light source so that light is emitted from the light source when the digital signal is high (e.g., a binary one), and no light is emitted from the light source when the digital signal is low (e.g., a binary zero). In another embodiment, the modulator may modulate the light source according to any type of modulation, such as frequency modulation (e.g., where the frequency of the carrier signal is modulated according to the digital signal) or amplitude modulation (e.g., where the carrier signal is varied in proportion to the digital signal). In one embodiment, the laser diode of the optical data transmitter may support a modulation rate greater than 1 GHz. In one embodiment, an external modulator (e.g., external with respect to the optical data transmitter 22) may also be used to modulate (e.g., amplitude modulation) the signal.

As described herein, the optical data transmitter 22 may include a laser diode, such as a vertical-cavity surface-emitting laser (VCSEL). In one embodiment, the laser diode may be a low-power laser diode, such as having a power output of below a threshold. For example, the low-power laser diode may have a power output less than 10 mW. In another embodiment, the laser diode may have a power output of less than (or approximately equal to) 1 mW. In one embodiment, the laser diode may have a power output between 0.5 Watts and 3 Watts. In another embodiment, the laser diode may have a power output between 1 Watt and 1.5 Watts. In some embodiments, the laser diode of the transmitter may be any type of laser that is capable of emitting light, such as visible light or infrared (IR) light. In one embodiment, the optical transmitter may include a low-power narrowband laser diode, such that the diode may be tunable to output light having optical power in a narrow wavelength range. For example, the low-power narrowband laser diode may produce an optical signal having a wavelength between 400 nm and 1,100 nm. In another embodiment, the optical data transmitter 22 may include any light source, such as one or more LEDs.

In one embodiment, the optical transmitter 22 is arranged to transmit one or more) optical signals as modulated light that passes through the user's cornea 31 and is directed (e.g., approximately) towards the optical data receiver 23, while the headset 12 is worn by the user and while the implant 13 is inside the eye of the user. The optical data receiver 23 may be configured to receive (or sense) the optical signal transmitted by the transmitter 22 that includes data. In particular, the receiver 23 may be arranged (or orientated) within the eye of the user to receive the optical signal transmitted by the transmitter 22. For example, the receiver 23 may be orientated such that at least a portion of the receiver would be within a line-of-sight of the transmitter 22, through the cornea. In one embodiment, the receiver 23 may include one or more photo sensors (or photodiodes) that are each configured to sense the optical signal (e.g., modulated light) produced by the optical data transmitter 22 that passes through the cornea 31, and produce an electrical (e.g., digital) signal according to the sensed signal. In one embodiment, the optical data receiver 21 may include a bandpass filter that may be centered at (approximately) the emission wavelength of the optical signal produced by the transmitter 22. In one embodiment, the receiver 23 may also include a demodulator that recovers (e.g., the encoded) data from the modulated optical signal.

Each of the headset 12 and the implant 13 may also include one or more (optional) optical transceivers. In particular, the headset 12 includes an optical data transceiver 42 and the implant 13 includes optical data transceiver 46, both of which may be configured to transmit and receive one or more optical signals. In one embodiment, the optical data transceiver 46 may be designed to transmit one or more optical signals, e.g., via a microscopic LED (micro LED) that transmits the signal through the cornea 31 and out of the eye. In one embodiment, the system 10 may use the transceivers 42 and 46 to establish one or more optical connections between the transceivers and/or other optical transmitters/receivers of the headset and implant. More about establishing connections is described herein.

In which case, both transceivers may have circuitry that includes one or more optical data transmitters and/or one or more optical data receivers. In one embodiment, the optical transceivers may include similar (or the same) circuitry as the optical transmitter and/or optical receiver, as described herein. For example, the optical transceivers may include one or more light emitting diodes (LEDs) as a light source. In one embodiment, the LED of a (transmitter of a) transceiver 42 may be arranged to emit light at a different wavelength than a laser diode of the transmitter 22. In another embodiment, the transceiver 46 of the implant 13 may emit light at a different wavelength than the transceiver 42 and/or the optical transmitter 22.

In some embodiments, the transceivers may include one or more bandpass filters that are centered at emission wavelengths of a corresponding transceiver's light source. For instance, the transceiver 46 may include a bandpass filter centered around the wavelength of the light source of the transceiver 42. As a result, data may be exchanged between the devices while minimizing data transmission errors due to multiple optical data connections 48 between the devices.

Thus, the optical data transmitters/receivers and/or transceivers establish optical data connections 48 between the headset 12 and the implant 13, which allow data to be transmitted and/or exchanged between the devices optically. For example, the optical data transmitter 22 and optical data receiver 23 may establish an optical data connection for the headset 12 to transmit image data to the implant 13 for presentation, and one or more optical data transceivers may allow both devices to wirelessly communicate. In one embodiment, the optical data transceivers 42 may be configured to transmit image data to the optical data transceiver 46. More about the devices communicating is described herein.

In one embodiment, the optical data transmitter 22 (and/or transceivers) may have a data bandwidth that allows image data that is captured by the headset 12 to be presented to the user, via the image formation device 25, with very little to no latency due to the wireless transmission over the optical connection 48 established between the transmitter and optical data receiver 23. In one embodiment, the bandwidth of the transmitter's connection may be approximately 100 Mb/sec.

As described thus far, the optical data transmitter 22 may include an optical modulator for performing amplitude modulation (e.g., at or around 1 GHZ) upon a laser diode according to a digital signal (e.g., which includes image data captured by the camera 16). In another embodiment, the optical data transmitter 22 may transmit the optical signal at one or more high frequencies, such as between 100 MHz to 10 GHz to transmit data at higher rates. In one embodiment, the laser diode of the transmitter 22 may be modulated according to a separate (or external) modulator. In which case, the (e.g., controller 40 of the) headset 12 may include a (e.g., circuitry of a) modulator, which may be communicatively coupled to the optical data transmitter and configured to control data transmission using the transmitter.

In one embodiment, the controller 44 may include implant microelectronic circuitry that may be configured to perform one or more computational operations. The controller 44 may be configured to receive the image data transmitted by the headset 12 (via an optical data connection 48 between the optical data transmitter 22 and optical data receiver 23), and may be configured to process the image data for presentation. For instance, the controller may decode the image data, and may present the image data through the image formation device 25 onto the retina of the user's eye.

In one embodiment, the image formation device 25 may be any type of electronic device that projects light onto at least a portion of the user's retina. For example, the device may include a laser projection system that has a laser projector that is configured to produce a laser beam (e.g., using a light source, such as a laser diode) that is projected onto a spot on the user's retina to reproduce image data. In one embodiment, the laser projector may be a scanning projection system that may include one or more (scanning) mirrors, one or more lens, and one or more actuators, optics (e.g., having an adjustable prism, one or more lens, etc.). Such a scanning projection system may be arranged to direct the laser beam onto the retina by using the actuators to actuate at least one of the mirrors. In particular, the system actuates the mirrors to scan the retina with the laser beam by moving across the retina generally horizontally in one dimension and/or generally vertically in another dimension.

In another embodiment, the image formation device 25 may include a micro-display. In one embodiment, micro-display may be implemented as a (e.g., two-dimensional (2D)) multi-color LED display array. In other embodiments, micro-display may be a backlit liquid crystal display (LCD), a monochrome LED display array, an organic LED (OLED) display, or otherwise. In one embodiment, the micro-display may have a resolution of between 30,000 pixels to 6 million pixels. In another embodiment, the resolution may be between 40,000 pixels and 4 million pixels. Examples of resolutions for a micro-display with an aspect ratio of 16:9 include 256×144, 1,280×720, 1,920×1,080, and 2,560×1, 440. In another embodiment, the micro-display may have any aspect ratio and/or any resolution. In one embodiment, micro-display may be a 5 mm diameter display while enclosure 24 of the implant may have an overall 10 mm×10 mm. In one embodiment, the micro-display outputs the image based upon the received image data. In one embodiment, the image formation device may include optics (e.g., one or more lens and/or mirrors), which may be used to focus the light projected by the micro-display onto retina 32.

As described herein, the image formation device 25 may include adjustable components that provides an adjustable focal distance (e.g., z-axis adjustment) to a regenerated image. In various embodiments, the formation device further includes one or more adjustable prisms that provide beam steering for lateral adjustments (x and/or y axis adjustment) of the position of the projected image, as described herein. Lateral adjustments ensure that a projected image is properly positioned/centered on retina 32 including the user's fovea. In one embodiment, the image formation device may display a video stream as a series of one or more regenerated (or projected) images as output by the image formation device.

Returning to the headset 12, the power source 41 may be any type of power source that is capable of powering (e.g., supplying current) to electronics of the headset 12. For instance, the power source may be a rechargeable battery that is housed within the headset 12. In one embodiment, the battery may be removable such that it may be charged.

As described herein, the power source 41 may also be capable of powering electronics of the headset 12 and supplying power to operate the (e.g., electronics of the) implant 13. In particular, the headset includes the optical power transmitter 20 for transmitting an optical signal through the cornea of the eye of the user (while the headset is worn by the user, and the user's eye is open) to establish an optical power connection 49 with the optical power receiver 21 of the implant, over which the headset 12 may provide optical power. In particular, the optical power transmitter 20 may be arranged to draw power from the power source 41 and produce an (e.g., high power) optical signal (e.g., as modulated light) directed towards the implant 13. In one embodiment, the optical power transmitter 20 may include a high-power laser diode that is capable of emitting (modulated) light having a power output above a threshold. For example, the high-power laser diode may have a power output that is equal to or greater than 0.5 Watts (W). In another embodiment, the high-power laser diode produce light having a power output between 0.5 W to 3 W. In some embodiments, the high-power laser diode of the optical power transmitter 20 may have a power output that is greater than the power output of the low-power laser diode of the optical data transmitter 22. In another embodiment, the optical power transmitter 20 may produce an optical signal with a power output that is greater than the power output of one or more optical data transceivers 42.

In one embodiment, the high-power laser diode of the optical power transmitter 20 may be designed to produce light, such as visible light and/or IR light. In particular, the high-power laser diode may produce IR light having a wavelength between 800 to 1,060 nm. In another embodiment, the wavelength of the IR high-power laser diode may preferably be between 900 to 1,000 nm. In some embodiments, the wavelength may be 980 nm, which may achieve greater than 50% efficiency for power transmission to the implant 13. In one embodiment, the optical power transmitter 20 may emit light having a wavelength, which when entering the eye may not be absorbed (or may be absorbed below a threshold) by the retina. For example, the light emitted by the transmitter 20 may have a wavelength of 1,310 nm or 1,550 nm. In another embodiment, the light produced by the optical power transmitter 20 may be focused, such as collimated, in order to minimize light absorbed by the eye of the user.

In one embodiment, the optical power receiver 21 may be arranged to receive the optical signal produced by the optical power transmitter 20 and may be arranged to produce power that may be used by the implant to operate one or more electronics. For instance, the receiver may provide power to the energy storage 45 from which the implant may draw power. In one embodiment, the energy storage may be any type of rechargeable device, such as a rechargeable battery. In particular, the energy storage may be any type of solid state device, or any other type of electricity storage device (e.g., a capacitor) that may be charged and recharged by the optical signal received by the optical power receiver 21.

In one embodiment, the optical power receiver 21 may include a photodiode that may receive the optical signal. In another embodiment, the receiver 21 may include a photovoltaic (PV) device that may produce power for the implant, responsive to receiving the transmitted optical signal (by the optical power transmitter) that passes through the cornea of the eye. In one embodiment, although the cornea 31 may be opaque to visible light, much of the opacity is due to scattering and not light absorption. Thus, an IR laser diode of the optical transmitter 20 may be less susceptible to scattering than visible light, and therefore the PV device may not require coherence to convert the signal to energy. In one embodiment, the PV device may include one or more PV cells that include one or more materials. For example, the PV device may include one or more crystalline silicon cells that produce electricity responsive to capturing light across one or more wavelengths. In another embodiment, the PV device may include one or more other types of cells, such as thin-film solar cells which may include materials such as cadmium telluride (CdTe) and/or gallium arsenide (GaAs). In one embodiment, the PV device may be optimized for the wavelength (or a range of wavelengths) of the optical signal produced by the optical transmitter 20. For example, the cells of the PV device may be crystalline silicon cells when the optical signal received by the receiver is less than 1,100 nm (or more preferably approximately 950 nm). In another embodiment, the cells of the PV device may not be crystalline silicon cells when the optical signal received by the receiver has a wavelength of either 1,310 nm or 1,550 nm, since silicon has a bandgap that is greater than those wavelengths. In one embodiment, the type of PV device that is used in the implant may be selected based on its PV conversion efficiency (e.g., percentage of received light converted into power). For example, the PV device may have a PV conversion efficiency of greater than or equal to 60%.

The system 10 also includes several optional elements. For instance, the headset 12 includes one or more optional optical power transmitters 43 (which may be the same or similar to the optical power transmitter 20, as described herein), and the implant 13 includes one or more optional optical power receivers 47 (which may be the same or similar to the optical power receiver 21, as described herein). In which case, the system may be capable of transmitting one or more optical power signals through different portions of the cornea of the user's eye, where the implant 13 may convert energy from one or more optical power receivers to power (e.g., the energy storage 45 of) the implant 13. In one embodiment, some optical power transmitters may be more optimized to power the implant 13 than others. For example, an optical power transmitter may not be aligned with an optical power receiver of the implant, and as a result, the optical receiver may not receive the optical signal produced by the transmitter. As another example, some optical signals may pass through portions of the cornea more effectively than others (e.g., due to the cornea's opacity). As a result, some power optical signals may be less efficient to power the implant than others. Thus, as described herein, the system may be capable of determining which of one or more optical power connections 49 are to be used to power the implant 13. In one embodiment, to make this decision, the implant 13 may include one or more sensors, S1, and S2, which may sense the power provided by each of their respective optical power receivers 21, and may provide a power reading to the controller 44 of the implant. The implant may use these power readings to determine which of the optical power connections 49 may most effectively power the implant, and as a result may instruct the headset to use optical power transmitters associated with those optical power connections 49 to power the implant 13. In which case, the headset may deactivate optical power transmitters that are less effective. More about determining which optical power connection is to power the implant is described herein.

As described herein, the headset 12 may include the optical data transmitter 22 that may transmit image data via an optical data connection 48 with the optical data receiver 23. In one embodiment, the headset 12 may transmit image data via one or more transceivers. In which case, an optical data transceiver 42 of the headset may include (e.g., elements of) the optical data transmitter 22.

Figure 5:
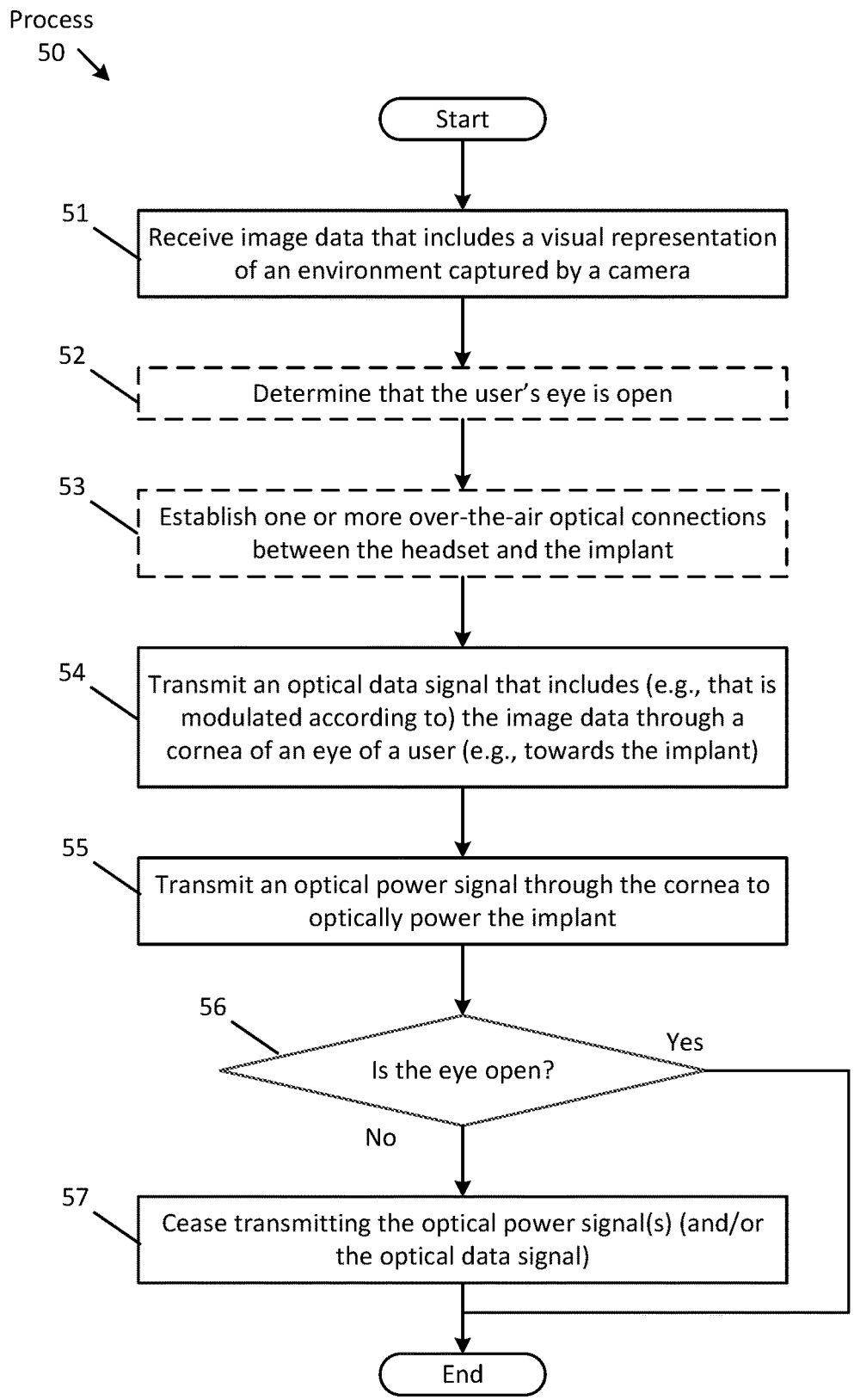
FIG. 5 is a flowchart of one embodiment of a process to transmit data and power to the implant.
Figure 6:
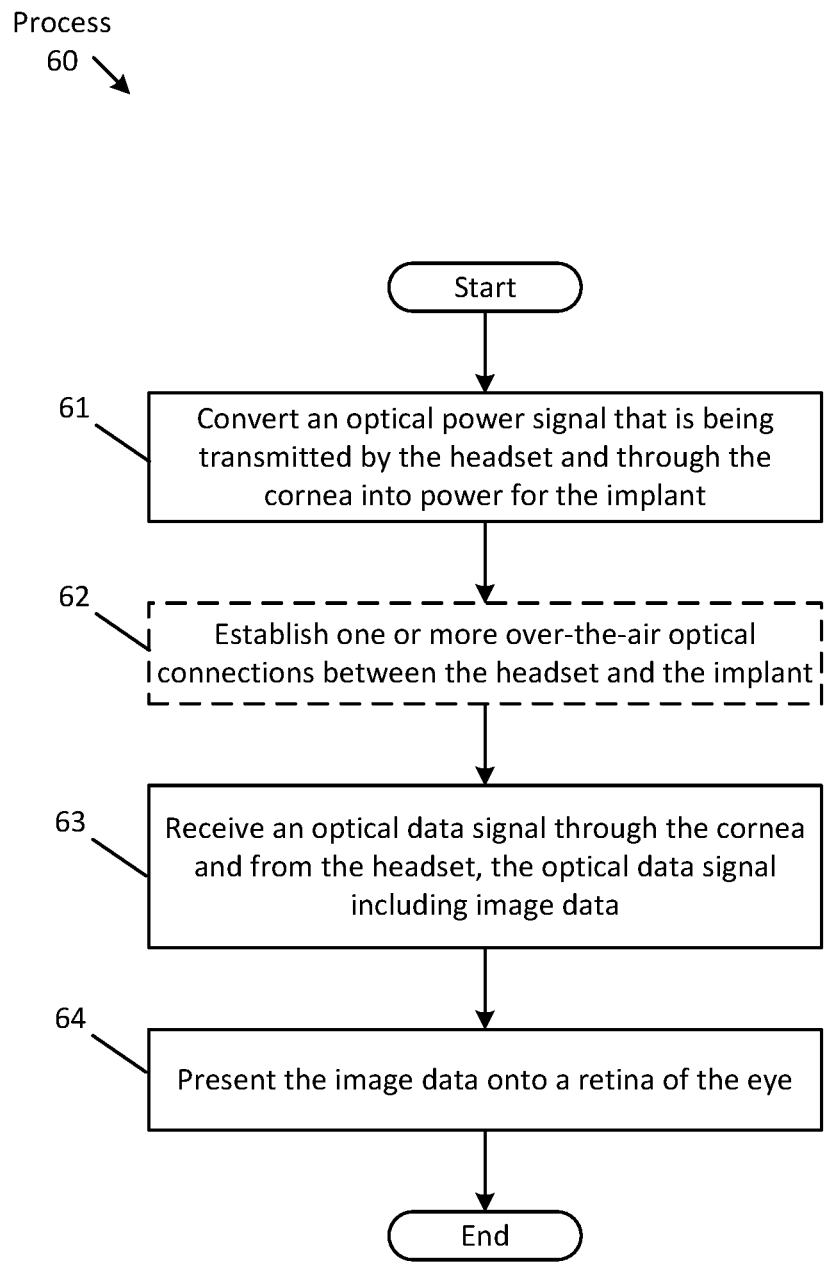
FIG. 6 is a flowchart of one embodiment of a process to convert an optical signal into power for the implant, and to present image data received optically.
Figure 7:
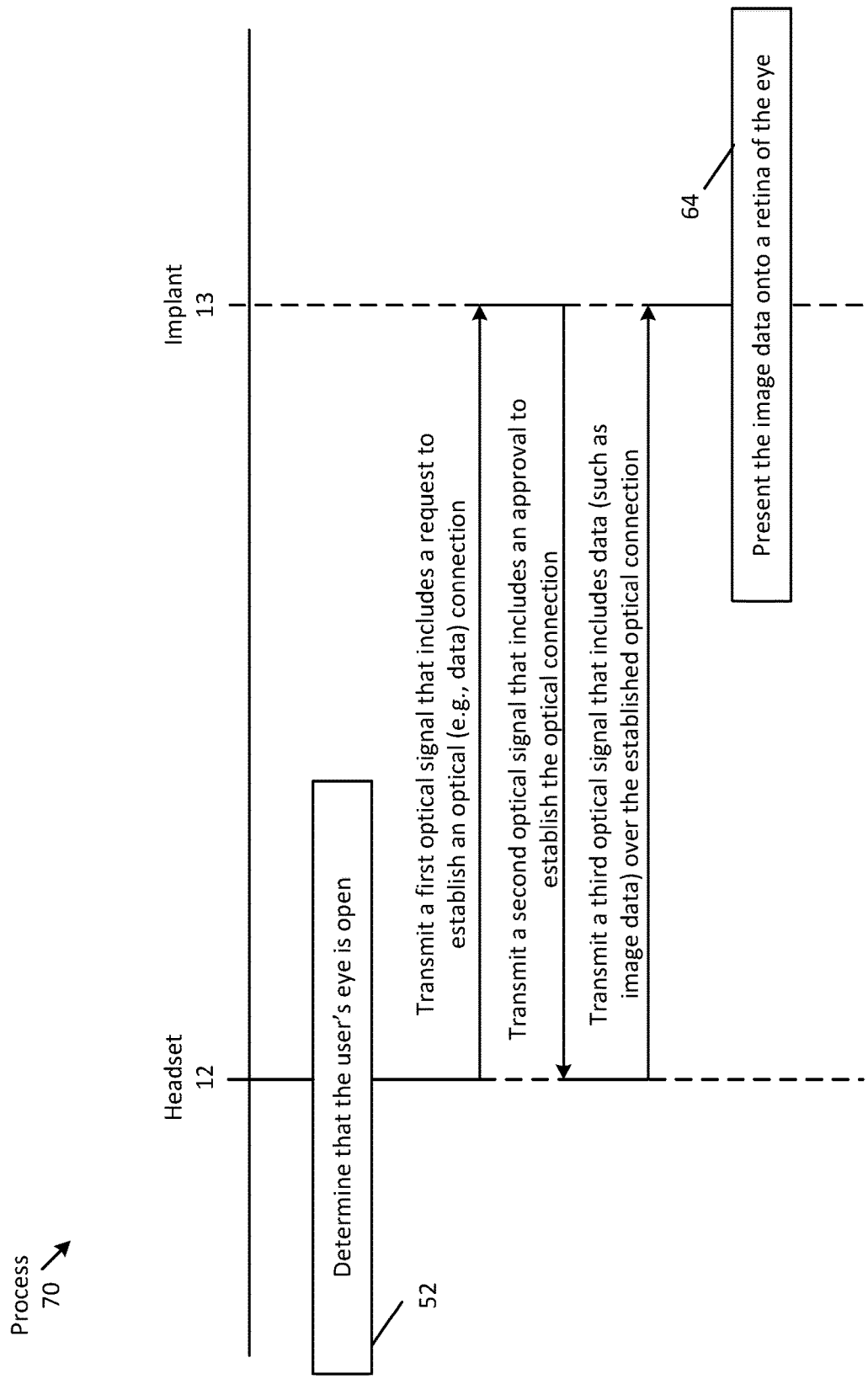
FIG. 7 is a signal diagram of one embodiment of a process in which an optical connection is established between the headset and the implant.
Figure 8:
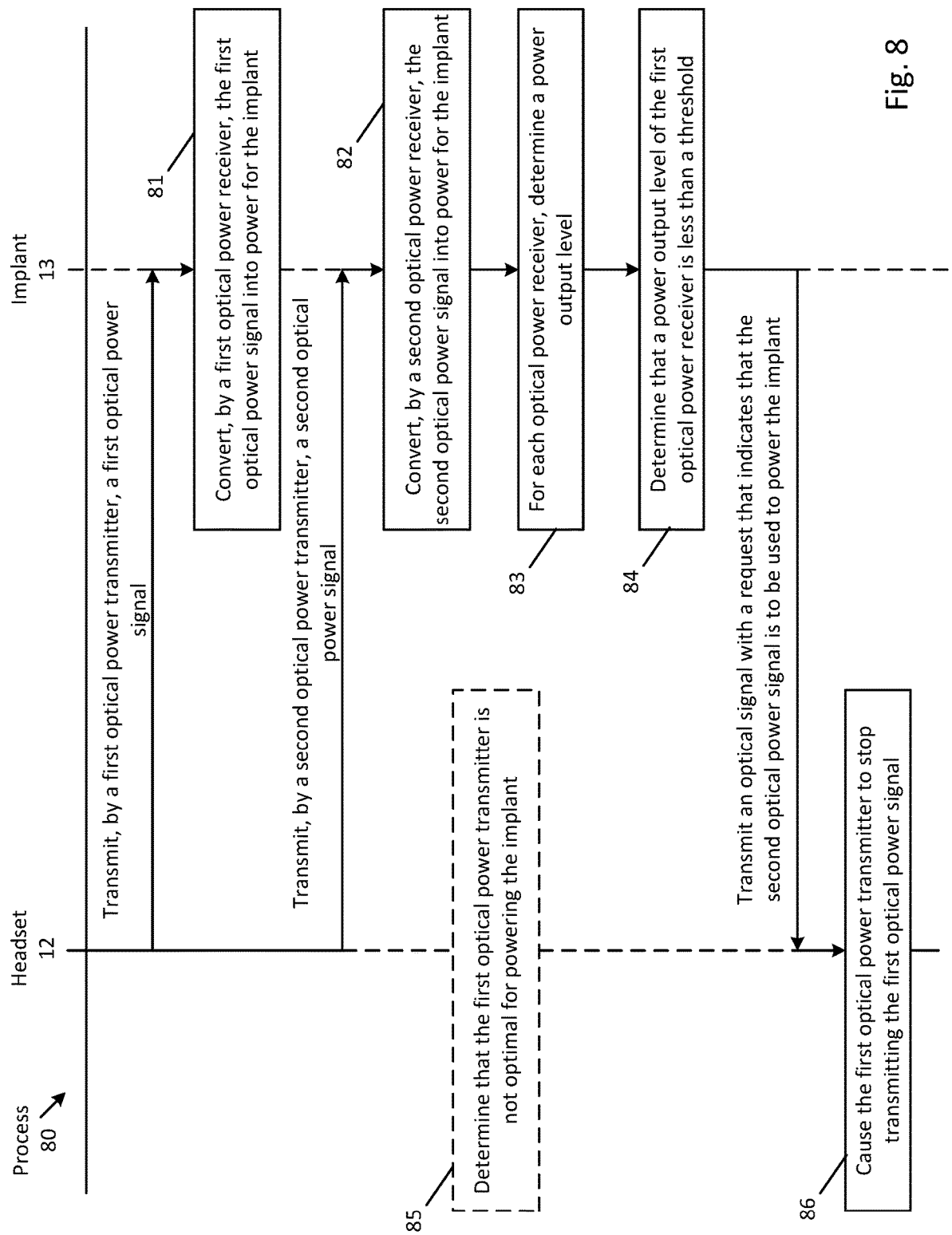
FIG. 8 is a signal diagram of one embodiment of a process of determining which optical power transmitter is to power the implant.

FIGS. 5 and 6 are flowcharts that include processes 50 and 60, respectively, that include operations performed by the one or more elements (such as the controller 40) of the headset 12 and one or more elements (such as the controller 44) of the implant 13, respectively. FIGS. 7 and 8 are signal diagrams that include processes 70 and 80, respectively, that include operations performed by the headset 12 and implant 13. In particular, at least some operations may be performed by the controller 40 of the headset 12 and at least some operations may be performed by the controller 44 of the implant 13. In one embodiment, although the operations described herein are with respect to a particular device (e.g., process 50 of FIG. 5 being performed by the headset 12), any of the operations described herein may be performed by one or more devices. For example, operations described herein that are performed by the headset may at least partially be performed by the implant.

Turning now to FIG. 5 is a flowchart of one embodiment of a process 50 to transmit data and/or power to the implant 13. The process 50 begins by the controller 40 receiving image data that includes a visual representation of an environment (of the headset 12) captured by a camera, such as camera 16 (at block 51). In particular, the image data may be captured by the camera 16 of the headset 12, while the headset is being worn by the user. In one embodiment, the image data may be received (and/or captured) in response to determining that the headset 12 is being donned (e.g., placed) on a user's head. In particular, the controller 40 may determine whether the headset 12 is being worn by the user based on sensor data of one or more sensors 19. For example, the controller may determine whether the headset is worn based on proximity data captured by the proximity sensor 18 (e.g., determining whether the proximity sensor is within a threshold distance of an object, such as a portion of the user's head). As another example, the controller 40 may determine whether the headset 12 is donned based on image data captured by the inward-facing camera 17. In this case, the controller 40 may perform an object recognition algorithm upon image data captured by the camera 17 to determine whether at least a portion of a user's face (e.g., an eye of the user) is within a field of view of the camera 17.

The controller 40 determines that the user's eye is open (at block 52). In particular, the controller may determine whether the eye that includes the implant 13 is open or closed based on sensor data, such as image data captured by the inward-facing camera 17. For instance, the controller may receive image data captured by the inward-facing camera 17 while the headset 12 is worn by the user, the captured image data having at least a portion of the eye of the user, such as the cornea. The controller 40 may perform the object recognition algorithm upon the image data to determine whether the eye is open or closed based on a detection of the portion of (e.g., the cornea of) the user's eye within the captured image data. If so, this may mean the user's eye is open and therefore one or more optical signals may be directed towards the user's eye without obstruction (e.g., due to one or both of the user's eyelid(s) being (at least partially) closed). In one embodiment, the controller 40 may begin to receive the image data captured by the camera 16 in response to determining that the user's eye is open.

The controller 40 establishes one or more over-the-air optical connection(s) between the headset 12 and the implant 13 (at block 53). In particular, the headset 12 and the implant may perform handshake (or synchronization) operations to establish of an optical data connection 48 between (at least) the optical data transmitter 22 and (at least) the optical data receiver 23. For example, prior to the headset being worn by the user, the headset 12 may not be capable of communicating optically with the implant. This may be due to optical transmitters of the headset not being aligned (e.g., directed towards) and/or within a threshold distance of optical receivers of the implant.

Once the headset is worn or initially donned by the user, the headset and the implant may exchange handshake data to coordinate optical communication. For example, once donned by the user, the system 10 may synchronize the headset and the implant to ensure that optical transmitters (and/or transceivers) of the headset are arranged (e.g., properly orientated) to communicate with optical receivers (and/or transceivers) of the implant. This may ensure that optical transmitters of the headset are arranged such that they are (approximately) directed towards corresponding optical receivers of the implant. Thus, over-the-air optical signals that are transmitted by the headset may be arranged such that they are directed towards the (e.g., optical receivers of the) implant, while the implant is inside the eye of the user.

In one embodiment, the handshake operations may be performed optically, such that the headset and the implant communicate via the optical data transceiver 42 and the optical data transceiver 46, respectively. Thus, once this initial optical data connection is created between the transceivers, the system 10 may establish one or more additional (e.g., data and/or power) connections between other optical devices. More about establishing an over-the-air optical connection is described herein.

The controller 40 transmits an optical data signal that includes (e.g., that is modulated according to) the image data through a cornea of an eye of a user, such as towards the implant 13 while it is inside the eye of the user (at block 54). In particular, the headset may establish a connection between the optical transmitter 22 and the optical receiver, and the controller may cause (drive) the optical transmitter to transmit the optical signal towards the receiver (over the established connection). For instance, the optical transmitter 22 may include a (e.g., low-powered) laser diode that may transmit the image data as an optical signal into the cornea of the user, and the optical receiver 23 may receive the optical signal. In one embodiment, the optical data transceiver 42 may include a light source to produce another optical signal (which may include similar or different data as the signal transmitted by the transmitter 22) that may not interfere with the optical signal produced by the optical transmitter 22. For instance, the transceiver 42 may include an LED for a light source that produces light having a different wavelength than a wavelength of light produced by the low-powered laser diode of the transmitter 22.

The controller 40 transmits an optical power signal through the cornea to optically power the implant 13 (at block 55). For example, as described herein, the optical power transmitter 20 may include a (e.g., high-powered) laser diode that may transmit a (high-power) optical signal (e.g., having power output greater than a threshold), which may be sensed by a PV device of the optical power receiver 21, which may be designed to convert the signal into electricity for powering the implant 13. In one embodiment, the headset may transmit the optical power signal before transmitting the image data, as described herein. In another embodiment, the optical power signal may be transmitted prior to establishing the over-the-air optical connection 48 between the optical data transmitter 22 and the optical data receiver 23.

In one embodiment, the controller 40 may be configured to align one or more transmitters with one or more receivers of the implant. In particular, the controller 40 may align the optical power transmitter 20 such that the transmitter transmits an optical signal to one or more specific locations onto the cornea of the user's eye. For example, the transmitter 20 may include optics (e.g., an adjustable prism, one or more lens, one or more mirrors, etc.) and/or one or more actuators for manipulating the optics for steering and/or focusing the light produced by the transmitter 20. In which case, the controller 40 may steer and/or focus the transmitter 20 such that it directs light to one or more locations onto the cornea such that one or more optical receivers of the implant may (e.g., optimally) sense the light. In one embodiment, the controller 40 may align the optical transmitter (e.g., by adjusting at least some of the optics of the transmitter 20) by detecting one or more locations on the cornea at which optical signals are to be transmitted based on performing the object recognition algorithm upon one or more images captured by the inward-facing camera 17. For example, the controller 40 may be configured to adjust a position of a mirror of the optics of the transmitter 20 based on images captured by the camera 17, such that the optical transmitter 20 tracks the PV device of the intraocular implant. In one embodiment, the controller 40 may detect the position of the PV device with respect to the (e.g., optical transmitter 20 of the) headset 12 by detecting the PV device and/or a location of the eye behind which the PV device is known to be positioned, based on the images captured by the camera 17.

The controller 40 determines whether the eye of the user is (e.g., still) open (at decision block 56). For example, the controller may base this determination on image data captured by the inward-facing camera, as described herein. If not, meaning that one or more eye lids may have moved such that one or more locations on the cornea towards which one or more optical signals are transmitted are obstructed by the one or more eye lids, the controller 40 ceases to transmit the optical power signal(s) and/or the optical data signal(s) (at block 57). In particular, the controller 40 may prevent the optical power transmitter 20 and/or one or more optical data transmitters from transmitting their respective over-the-air optical signal(s) while the eye of the user is closed. For instance, if the optical power connection 49 between the optical power transmitter 20 and the optical power receiver 21 is obstructed, the controller 40 may cause the high-power laser diode of the optical power transmitter 20 to stop transmitting an optical signal (e.g., by ceasing to drive the laser diode). This may allow the system 10 to preserve power at the headset.

In one embodiment, the controller 40 may periodically determine whether the eye is open, while transmitting the data and power optically. For example, the controller 40 may be configured to analyze sensor data one or more times a second to determine if the user's eye is closed. Along with (or in lieu of) determining whether the eye is open, the controller 40 may be configured to determine whether the optical (e.g., power) transmitters remain properly aligned with corresponding optical receivers of the implant. In such a case, the controller 40 may be configured to determine whether the position of the cornea of the eye is at a particular location within the field of view of the camera 17. If not, or if the eye is closed, the controller 40 may deactivate one or more of the optical transmitters, as described herein. In another embodiment, the controller 40 may resume optical signal transmission in response to determining the eye is opened and/or in response to determining that the cornea of the eye is at the particular location within the field of view of the camera.

FIG. 6 is a flowchart of one embodiment of a process 60 to convert an optical signal into power for the implant, and to present image data received optically. The process 60 begins by converting, by an optical power receiver 21, an optical signal that is being transmitted by the headset and through the cornea into power from the implant (at block 61). For instance, the optical power receiver 21 may provide converted power to the energy storage 45, which may use the power (along with stored power) to power one or more elements, such as the controller 44 and image formation device 25, of the implant 13.

The (e.g., controller 44 of the) implant 13 establishes one or more over-the-air optical connections between the headset and the implant (at block 62). For example, once the implant 13 is powered, the controller may monitor data received by the optical data transceiver 46, and upon receiving synchronization data, may establish the connection 48 between the optical data transmitter 22 and receiver 23. The controller 44 receives an optical data signal through the cornea and from the headset, the optical data signal including image data (at block 63). In particular, the controller 44 may be configured to receive, by the optical data receiver 23 and while the implant 13 is inside the eye of the user, an optical signal that includes image data through the cornea of the eye and from the headset. Thus, the implant may receive image data over an established over-the-air optical connection. The controller 44 presents the image data onto a retina of the eye (at block 64). In particular, image data may be presented onto the retina of the eye by the image formation device 25 of the implant. For instance, the controller may render the image data onto a micro-display of the image formation device 25, such that pixel light output of a 2D array of pixels of the micro-display is projected towards and onto at least a portion of the user's retina.

In one embodiment, the implant may establish the one or more optical connections before receiving an optical power signal from the headset. For instance, the implant may store energy in the energy storage 45, which may be used by the implant 13 to power some of the electronics (e.g., the controller 44 and the optical data transceiver 46, for a period of time) before receiving power from the headset. In which case, the controller 44 may be configured to (e.g., periodically) monitor the optical data transceiver 46 to determine whether an optical signal is being received to establish one or more optical connections. Once a signal is received, the controller 44 may be configured to establish one or more optical power connections 49 to receive power from the headset and/or establish one or more optical data connections 48 to receive image data from the headset.

FIG. 7 is a signal diagram of one embodiment of a process 70 in which an optical connection is established between the headset 12 and the implant 13. In particular, this signal diagram illustrates handshake operations performed between the devices to establish one or more optical connections, such as connections 48 and/or connections 49. For instance, the handshake operations may ensure that both devices are synchronized (and/or in a particular configuration), such that optical transmitters of one device may be aligned with respective optical receivers of another device to establish optical connections between each other. The process 70 begins by the controller 40 of the headset determining that the user's eye is open (at block 52). As described herein, the controller 40 may make this determination based on image data captured by the inward-facing camera 17.

The controller 44 transmits a first optical signal that includes a request to establish an optical (e.g., data) connection. In particular, the request may indicate a desire to establish a connection between the optical transmitter 22 and the optical receiver 23. In one embodiment, the optical signal may include a message that includes a request to begin transmission of image data to the implant. In one embodiment, optical data transceiver 42 may transmit the first optical signal that includes the request, into a portion of the user's cornea and directed towards the implant 13 inside the user's eye. In one embodiment, the portion towards which the optical signal is directed may be a predefined location behind which the implant 13 may be located. The implant is configured to receive the first optical signal. Specifically, the optical data transceiver 46 may receive the first optical signal and may provide the request to the controller. In one embodiment, the request may include one or more communication parameters. For instance, the request may include an indication of an image format in which the image data (to be received) is encoded. In another aspect, the request may indicate which optical receivers of the implant are to receive data and/or power from the headset.

Responsive to receiving the first optical signal, the controller 44 of the implant may be configured to transmit a second optical signal that includes an approval (or acknowledgement) to establish one or more optical connections. In particular, the controller 44 may transmit the approval via the optical data transceiver 46 for the headset to begin transmitting image data for reception by the optical data receiver 23. In one embodiment, the second optical signal may be different than the first optical signal. For example, both signals may be modulated according to different wavelengths, such that they do not interfere with each other.

The headset 12 may be arranged to receive the second optical signal that includes the approval. In particular, a (e.g., photodiode of the) transceiver 42 may receive the second optical signal. Responsive to receiving the approval, the optical data connection between the (e.g., transmitter 22 and the receiver 23 of the) headset 12 and the implant may be established, and the headset may transmit a third optical signal that includes the data (such as image data) over the established optical connection. In particular, the optical signal that includes the image data may be transmitted responsive to the photodiode of (transceiver 42 of) the headset 12 receiving the optical signal from the implant 13 and through the cornea of the eye. Thus, the controller may establish an over-the-air optical connection between the optical transmitter 22 and optical receiver 23 using another optical transmitter (e.g., of the transceiver 42) of the headset and another optical receiver (e.g., of the transceiver 46) of the implant, where the transmitter 22 may transmit image data and may be received by the receiver 23 once the over-the-air connection is established with the receiver 23. In one embodiment, responsive to receiving the image data, the implant may present the image data onto a retina of the eye (at block 64). Thus, to establish the optical data connection, the headset and implant may establish an initial optical connection that allows both devices to exchange handshake data.

As described thus far, the headset may transmit an optical power signal via the optical power transmitter 20 directed through the cornea, to be received by the optical power receiver 21, which converts the optical signal into power. In one embodiment, the system 10 may include several optical power transmitters for transmitting power to the implant. For example, as shown in FIG. 4, the headset 12 includes an additional (optional) optical power transmitter 43 may be arranged to transmit an optical signal to an additional (optional) optical power receiver 47 of the implant. In which case, the system 10 may be configured to determine which optical power transmitter is to transmit power to the implant. For example, when one optical power transmitter is not providing a sufficient amount of power to the implant (e.g., due to the transmitter not being aligned to a respective optical receiver of the implant), the system may transmit power to the implant using one or more other optical power transmitters. As another example, when multiple optical power transmitters are (capable of) transmitting optical signals, the system may determine which of the transmitters may be used to optimally power the implant. This has many benefits, such as ensuring that the system efficiently and effectively powers the implant and preventing portions of the user's eye from inadvertently absorbing an optical signal transmitted by an optical power transmitter, when the signal is not received by a corresponding optical power receiver of the implant 13.

FIG. 8 is a signal diagram of one embodiment of a process 80 of determining which optical power transmitter is to power the implant, of several optical power transmitters.

The process 80 begins by the (controller 40 of the) headset 12 transmitting, by a first optical power transmitter (e.g., transmitter 20), a first optical power signal. A first optical power receiver (e.g., receiver 21) converts the first optical power signal into power for the implant (at block 81). The headset 12 transmits, by a second optical power transmitter (e.g., transmitter 43), a second optical power signal. This signal may be received and converted, by a second optical power receiver (e.g., receiver 47), into power for the implant (at block 82). In one embodiment, the headset 12 may transmit two or more optical power signals.

For each optical power receiver, the controller 44 may determine a power output level (at block 83). For instance, the controller 44 may receive a respective power output level of each of the receivers from a respective sensor (e.g., receiving a power output level of receiver 21 from S1, and receiving a power output level of receiver 47 from S2). The controller 44 determines that a power output level of the first optical power receiver is less than a threshold (at block 84). In one embodiment, the threshold may be a predefined threshold, or may be a dynamic threshold that is based on a required amount of power to operate the implant 13. In which case, the controller may determine the threshold based on which elements of the implant 13 are currently operating. In one embodiment, the power output of the optical power receiver 21 may be based on various factors, such as the user's eye lid partially closing, thereby blocking the optical signal transmitted by the optical power transmitter. As another example, the power output may change based on a change to the headset. For instance, the data and power mount 15 may have been adjusted by the user, causing the orientation of the power transmitter 20 to change, thereby not being directed towards the cornea (or more specifically towards the optical receiver 21).

Responsive to determining that the power output of the first optical power receiver is less than the threshold, the controller 44 of the implant 13 transmits an optical signal with a request that indicates that the second optical power signal is to be used to power the implant. In one embodiment, the request may be transmitted through one or more established data connections, such as through an optical connection between the optical data transceivers 42 and 46. The controller 40 causes the first optical power transmitter to stop transmitting the first optical power signal (at block 86). In particular, the controller may transmit a control signal to the optical power transmitter 20 to cause it to cease producing the modulated light. Thus, the system is able to determine which optical transmitter may optimally transfer energy from the headset to the implant.

In one embodiment, the headset may determine which optical power transmitter is to transmit an optical power signal. In particular, the controller 40 may determine which optical signal to use based on image data captured by the inward-facing camera. For example, the controller 40 may monitor image data captured by the camera 17 to determine whether the location towards which an optical power signal is transmitted is associated with a requisite reflection signature, which may be due to the (e.g., PV device of the) corresponding optical power receiver capturing the signal. If the signature is not detected, meaning that the signal is not being detected by an optical receiver, the controller 40 may determine that the optical power transmitter 20 is not optimal for powering the implant because it may not be aligned with an optical power receiver (at block 85). In which case, the controller 40 may be configured to cause the first optical power transmitter to cease transmission at block 86.

As described thus far, the system may transmit two optical power signals, and may be configured to select one of the signals for transmitting power to the implant. In one embodiment, the headset may transmit more than two optical signals from which the implant may select one or more for providing power. In which case, the implant may select optical power connections 49 that provide output power above threshold for powering the implant. In another embodiment, the system may transmit one optical power signal, and may begin to transmit power via one or more other optical power transmitters based on determining that the original optical power transmitter is not optimally powering the implant. For instance, upon receiving an indication from the implant that an optical power transmitter is not providing sufficient power (e.g., due to power output of an optical receiver being less than the threshold), the headset may cause another optical power transmitter 43 to begin to transmit an optical signal.

In another embodiment, the operations of process 80 may be performed upon the system 10 detecting that the headset 12 is donned upon the user's head. In another embodiment, at least some of the operations may be performed periodically, in order to ensure that the implant is provided sufficient power to operate.

Some embodiments may perform variations to one or more processes described herein. For example, the specific operations of the process may not be performed in the exact order shown and described. The specific operations may not be performed in one continuous series of operations and different specific operations may be performed in different embodiments. In one embodiment, at least some of the operations of one or more processes described herein may be optional. In particular, blocks that have dashed boundaries may be optionally performed when their respective processes are performed. For example, the operations performed by the headset 12 to determine that the second optical power transmitter is not optimal for powering the implant at block 85 of process 80 in FIG. 8 may be optionally performed by the headset 12.

As previously explained, an embodiment of the disclosure may be a non-transitory machine-readable medium (such as microelectronic memory) having stored thereon instructions, which program one or more data processing components (generically referred to here as a "processor") to perform operations, such as the (image) signal processing operations, network operations, optical data transmission operations, and optical power transmission operations, as described herein. In other embodiments, some of these operations might be performed by specific hardware components that contain hardwired logic. Those operations might alternatively be performed by any combination of programmed data processing components and fixed hardwired circuit components.

While certain embodiments have been described and shown in the accompanying drawings, it is to be understood that such embodiments are merely illustrative of and not restrictive on the broad disclosure, and that the disclosure is not limited to the specific constructions and arrangements shown and described, since various other modifications may occur to those of ordinary skill in the art. The description is thus to be regarded as illustrative instead of limiting.

To aid the Patent Office and any readers of any patent issued on this application in interpreting the claims appended hereto, applicants wish to note that they do not intend any of the appended claims or claim elements to invoke 35 U.S.C. 112 (f) unless the words "means for" or "step for" are explicitly used in the particular claim.

In some embodiments, this disclosure may include the language, for example, "at least one of [element A] and [element B]." This language may refer to one or more of the elements. For example, "at least one of A and B" may refer to "A," "B," or "A and B." Specifically, "at least one of A and B" may refer to "at least one of A and at least one of B," or "at least of either A or B." In some embodiments, this disclosure may include the language, for example, "[element A], [element B], and/or [element C]." This language may refer to either of the elements or any combination thereof. For instance, "A, B, and/or C" may refer to "A," "B," "C," "A and B," "A and C," "B and C," or "A, B, and C."

What is claimed is:

1. An intraocular system comprising:
a headset including a camera to capture image data that includes a visual representation of an environment of the headset and an optical transmitter to transmit the image data as an optical signal within a wavelength range into a cornea of an eye of a user when the user is wearing the headset; and
an implant including:
an optical receiver to (1) receive the optical signal through the cornea, and (2) receive a second optical signal at a wavelength outside of the wavelength range; and
an image formation device orientated to present the image data from the optical signal onto a retina of the eye when the implant is inside the eye.

2. The intraocular system of claim 1, wherein the optical signal comprises modulated light that passes through the cornea of the eye and is directed towards the optical receiver while the headset is worn by the user and while the implant is inside the eye.

3. The intraocular system of claim 1,
wherein the optical transmitter is a first optical transmitter, and the optical signal is a first optical signal,
wherein the headset further comprises a second optical transmitter to transmit, through the cornea of the eye, the second optical signal which comprises a request to establish an over-the-air optical connection between the first optical transmitter and the optical receiver, and
wherein the first optical transmitter is to transmit the image data once the over-the-air optical connection is established.

4. The intraocular system of claim 3, wherein the first optical transmitter comprises a low-powered laser diode, and the second optical transmitter comprises a light emitting diode (LED).

5. The intraocular system of claim 3,
wherein the second optical transmitter comprises a first optical transceiver,
wherein the implant further comprises a second optical transceiver to transmit an acknowledgement as a third optical signal through the cornea of the eye and directed towards the first optical transceiver responsive to the implant receiving the second optical signal, and
wherein the over-the-air optical connection is established responsive to the first optical transceiver receiving the third optical signal.

6. The intraocular system of claim 1,
wherein the optical transmitter is a first optical transmitter, and the optical signal is a first optical signal,
wherein the headset further comprises a second optical transmitter to transmit the second optical signal through the cornea of the eye while the headset is worn by the user, and
wherein the implant further comprises a photovoltaic device to produce power for the implant, responsive to receiving the second optical signal when the implant is inside the eye.

7. The intraocular system of claim 6, wherein the first optical transmitter comprises a low-powered laser diode, and the second optical transmitter comprises a high-powered laser diode.

8. The intraocular system of claim 7, wherein the high-powered laser diode comprises an infrared laser diode that is arranged to produce the second optical signal with a wavelength between 800 nm and 1,060 nm.

9. The intraocular system of claim 6,
wherein the camera is a first camera, and
wherein the headset further comprises:
an inward-facing camera to capture images of the eye of the user while the headset is worn by the user; and
a controller that is communicatively coupled with the inward-facing camera and the second optical transmitter, wherein the controller is configured to:
determine whether the eye of the user is open based on the images captured by the inward-facing camera,
cause the second optical transmitter to transmit the second optical signal while the eye of the user is open, and
prevent the second optical transmitter from transmitting the second optical signal while the eye of the user is closed.

10. A method performed by an intraocular implant, the method comprising:
receiving, by a first optical receiver of the intraocular implant and while the intraocular implant is inside an eye of a user, an optical signal through a cornea of the eye and from a headset that is being worn by the user, wherein the optical signal comprises image data captured by a camera of the headset;
receiving, while the intraocular implant is inside an eye of a user, a second optical signal through a cornea of the eye and from a headset that is being worn by the user, wherein the second optical signal comprises a request to establish an over-the-air optical connection between the first optical receiver and a first optical transmitter of the headset; and
presenting, by an image formation device of the intraocular implant, the image data onto a retina of the eye.

11. The method of claim 10, wherein the method further comprises establishing the over-the-air optical connection using a second optical receiver of the intraocular implant, wherein the optical signal is received once the over-the-air optical connection is established.

12. The method of claim 11, wherein the optical signal is a first optical signal, wherein establishing the over-the-air optical connection comprises:
receiving, by the second optical receiver, the second optical signal through; and
transmitting, by a second optical transmitter of the intraocular implant, a third optical signal through the cornea of the eye that comprises an approval.

13. The method of claim 10, wherein the optical signal is a first optical signal, wherein the method further comprises converting, by a photovoltaic (PV) device of the intraocular implant, a second third optical signal that is being transmitted by the headset into power for the intraocular implant.

14. The method of claim 13, wherein the PV device is a first PV device, wherein the method further comprises:

determining a first power output level of the first PV device;

converting, by a second PV device of the intraocular implant, a fifth optical signal that is being transmitted by the headset into power for the intraocular implant;

determining a second power output level of a second PV device; and responsive to determining that the first power output level is less than the second power output level, transmitting, by an optical transmitter of the intraocular implant, a fourth optical signal through the cornea of the eye and to the headset, the fourth optical signal comprising a request to cease transmitting the third optical signal.

15. The method of claim 10, wherein the optical signal has a different wavelength than a wavelength of the second optical signal.

16. The method of claim 15, wherein the wavelength of the second optical signal is between 800 nm and 1,060 nm.

17. A method performed by an intraocular system that includes a headset and an implant, the method comprising:
receiving image data captured by a camera of the headset while the headset is worn by a user, the image data including a visual representation of an environment of the headset;

transmitting, by a high-powered laser diode, a first over-the-air optical signal through a cornea of an eye of the user to optically power the implant;

transmitting, by a low-powered laser diode, a second over-the-air optical signal through the cornea, wherein the second over-the-air optical signal comprises the image data captured by the camera, and transmitting, by a light emitting diode (LED), a third over-the-air optical signal into the cornea of the eye and to the implant that is inside the eye, wherein the third over-the-air optical signal comprises a request to begin transmission of the image data, wherein the first and second over-the-air optical signals are directed towards the implant while the implant is inside the eye of the user.

18. The method of claim 17, wherein the high-powered laser diode comprises an infrared laser diode that is arranged to produce the first over-the-air optical signal with a wavelength between 800 nm and 1,060 nm.

19. The method of claim 17 further comprises:
receiving image data captured by an inward-facing camera of the headset while the headset is worn by the user, wherein the image data captured by the inward-facing camera includes at least a portion of the eye;

determining whether the eye is open or closed based on the image data captured by the inward-facing camera; and responsive to determining that the eye is closed, causing the high-powered laser diode to stop transmitting the first over-the-air optical signal.

20. The method of claim 17
wherein the second over-the-air optical signal is transmitted responsive to receiving, by a photodiode of the headset, a fourth over-the-air optical signal from the implant and through the cornea of the eye.

* * * * *